United States Patent [19]

McCarthy

[11] 3,925,330

[45] Dec. 9, 1975

[54] CASTABLE COMPOSITIONS CONTAINING UNSATURATED LIQUID VINYLIDENE-TERMINATED POLYMERS

[75] Inventor: William J. McCarthy, Avon Lake, Ohio

[73] Assignee: The B.F. Goodrich Company, Akron, Ohio

[22] Filed: Jan. 7, 1974

[21] Appl. No.: 431,076

[52] U.S. Cl. ............... 260/78.5 B; 260/78.5 E; 260/78.5 HC; 260/475 N
[51] Int. Cl.$^2$ C08F 2/00; C08F 222/10; C08F 236/20
[58] Field of Search ...... 260/78.4 D, 78.4 E, 475 R, 260/475 N, 468 R, 537 R, 78.5 B, 78.5 E, 78.5 HC, 86.1

[56] References Cited
UNITED STATES PATENTS

| | | | |
|---|---|---|---|
| 3,285,949 | 11/1966 | Siebert | 260/465.4 |
| 3,431,235 | 3/1969 | Lubowitz | 260/47 |
| 3,448,089 | 6/1969 | Celeste | 260/78.5 |
| 3,652,520 | 3/1972 | Ryan et al. | 260/86.1 |

*Primary Examiner*—John Kight, III
*Attorney, Agent, or Firm*—Alan A. Csontos

[57] ABSTRACT

Compositions comprising a liquid vinylidene-terminated polymer containing olefinic unsaturation in the polymeric backbone, a polymerizable vinyl monomer, and a free-radical catalyst system are readily castable. Upon heating, the composition cures to yield an elastomeric vulcanizate having a tensile strength in excess of 400 psi. The castable compositions are useful as caulks, sealants, potting compounds, encapsulants, and to prepare molded articles, and the like.

7 Claims, No Drawings

CASTABLE COMPOSITIONS CONTAINING UNSATURATED LIQUID VINYLIDENE-TERMINATED POLYMERS

CROSS-REFERENCE TO RELATED APPLICATION

Reference is made to related copending application Ser. No. 292,926 filed on Sept. 28, 1972 by D. E. Skillicorn.

BACKGROUND OF THE INVENTION

Liquid vinyl-terminated polymers and olefinically unsaturated polymers have been used to prepare potting compounds, caulks, adhesive, and the like. A relatively recent development is the mixing of such polymers with vinyl monomers and curing the mix using peroxides. See U.S. Pat. Nos. 2,824,821; 3,160,678; 3,160,679; 3,231,634; 3,300,544; 3,652,520; 3,660,532; and 3,733,370; and British Patents 924,624 and 755,321.

SUMMARY OF THE INVENTION

The castable compositions comprise (1) 100 parts by weight of a liquid vinylidene-terminated polymer of the structure

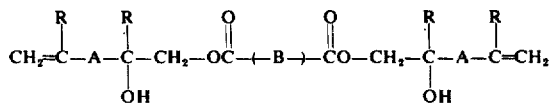

where R is hydrogen or a methyl radical; A is a bivalent radical consisting of 1 to 6 atoms selected from the group consisting of C, O, S, and N; and B is a polymeric backbone consisting of carbon-carbon linkages and containing olefinic unsaturation, (2) from about 20 parts to about 180 parts by weight of a polymerizable vinyl monomer, and (3) from about 0.1 part to about 5 parts by weight of a free-radical catalyst system.

DETAILED DESCRIPTION

Liquid polymers having highly reactive terminal vinylidene groups and containing olefinic unsaturation in the polymeric backbone are prepared by reacting liquid dienic polymers having terminal carboxyl groups with a compound containing a vinylidene group and an epoxide group. These polymers are admixed with polymerizable vinyl monomers and a free-radical catalyst, and heated to yield elastomeric vulcanizates having tensile strengths in excess of 400 psi.

The castable compositions comprise a liquid vinylidene-terminated polymer containing olefinic (>C=C<) unsaturation in the polymeric backbone, at least one polymerizable vinyl monomer and a free-radical catalyst system. The vinyl monomer is used at from about 20 parts to about 180 parts by weight and the free-radical catalyst system at from about 0.1 part to about 5 parts by weight, both based on 100 parts by weight of the liquid polymer. More preferredly, the vinyl monomer is used at about 50 parts to about 150 parts by weight and the free-radical catalyst system at about 0.5 part to about 3 parts by weight.

Preparation of Liquid Vinylidene-Terminated Polymers

The liquid vinylidene-terminated polymers are prepared by the reaction of a liquid polydienic polymer having terminal carboxyl groups with a compound containing a vinylidene group (CH$_2$=C<) and an epoxide

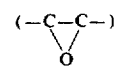

group.

The liquid polydienic polymers have the structure

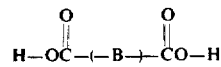

wherein B is a polymeric backbone consisting of carbon-carbon linkages and containing olefinic (>C=C<) unsaturation. The polymers are designated as liquid carboxyl-terminated polymers.

The terminal carboxyl (COOH) group comprises from about 0.5% to about 8% by weight, and more preferredly from about 1% to about 4% by weight of the liquid polydienic polymer. The polymers theoretically have a 2.0 functionality; i.e., one carboxyl group at each end of the polymer molecule. However, due to methods of preparation, the polymers can contain as low as an average of about 1.2 functional groups per molecule to as high as an average of about 4 functional groups per molecule (when carboxyl groups are present as pendant groups to the polymer backbone). In practice then the liquid polydienic polymer contains from about an average of 1.2 to about 4, and preferably from about 1.5 to about 2.5 carboxyl groups per molecule.

The polymeric backbone B consists of carbon-carbon linkages derived from polymerized units of a diene monomer(s), alone or copolymerized with vinyl monomers. The backbone contains from about 20% by weight, preferably from about 50% by weight, to 100% by weight of polymerized units of at least one diene monomer containing 4 to about 10 carbon atoms in the molecule such as butadiene, isoprene, 2-methyl-1,3-butadiene, 2-isopropyl-1,3-butadiene, chloroprene, and the like; and up to about 80%, preferably up to 50%, by weight of a vinyl monomer(s) selected from the group consisting of (a) vinyl aromatics such as styrene, α-methyl styrene, vinyl toluene, and the like; (b) vinyl nitriles such as acrylonitrile, methacrylonitrile, and the like; (c) vinyl acids such as acrylic acid, methacrylic acid, maleic acid, itaconic acid, and the like; (d) vinyl and allyl alcohols such as o-, m-, and p-vinylbenzyl alcohol, allyl alcohol, hydroxyethyl acrylate, and the like; (e) vinyl and allyl esters such as vinyl acetate, vinyl propionate, allyl acetate, and the like; (f) vinyl and allyl ethers such as vinyl methyl ether, allyl methyl ether, and the like; (g) divinyls and diacrylates such as divinyl benzene, divinyl ether, diethylene glycol diacrylate, and the like; and (h) acrylic esters of the formula

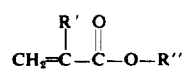

wherein R' is —H, —CH$_3$ or —C$_2$H$_5$, and R'' is an alkyl radical containing 1 to 18 carbon atoms or an alkoxyalkyl, an alkylthioalkyl, or cyanoalkyl radical containing 2 to about 12 carbon atoms. Examples of such acrylic esters are ethyl acrylate, butyl acrylate, hexyl acrylate, 2-ethylhexyl acrylate, dodecyl acrylate, octadecyl acrylate, methoxyethyl acrylate, butoxyethyl acrylate, hexyl thioethyl acrylate, β-cyanoethyl acrylate, cyanooctyl acrylate, methyl methacrylate, octyl methacrylate, ethyl ethacrylate, and the like. Often more than two types of polymerized monomeric units are contained in the polymeric backbone. The more preferred diene monomer and vinyl monomer combination consists of from about 60 percent to 100% by weight of polymerized units of diene monomer and up to 40% by weight of polymerized units of a vinyl monomer(s) selected from the group consisting of vinyl aromatics, vinyl nitriles, vinyl acids, and acrylic esters.

Examples of liquid carboxyl-terminated polymers are carboxyl-terminated polybutadiene, carboxyl-terminated polyisoprene, carboxyl-terminated poly(butadiene-acrylonitrile), carboxyl-terminated poly(butadiene-styrene), carboxyl-terminated poly(butadiene-acrylonitrile-acrylic acid), carboxyl-terminated poly(butadiene-allyl alcohol), carboxyl-terminated poly(ethylacrylate-butadiene), carboxyl-terminated poly-(ethylacrylate-isoprene), carboxyl-terminated poly(n-butylacrylate-isoprene-acrylonitrile), carboxyl-terminated poly(butylacrylate-chloroprene), and the like. The polymers can be prepared by free-radical polymerization using carboxylcontaining initiators and/or modifiers as disclosed in U.S. Pat. No. 3,285,949, and German Patent 1,150,205, or by solution polymerization using lithium metal or organo-metallic compounds and post-treating the polymers to form carboxyl groups as disclosed in U.S. Pat. Nos. 3,135,716 and 3,431,235.

The liquid polymer reactants have an average carboxyl group functionality of from about 1.2 to about 4, and more preferably from about 1.5 to about 2.5. The average functionality can be determined by multiplying the molecular weight of the polymer by the equivalent parts per hundred of carboxyl groups. The molecular weight can be measured using a Mechrolab Vapor Pressure Osmometer. The equivalent parts per hundred of carboxyl groups is determined by measuring the weight percent of carboxyl groups in the polymer (by titration of a polymer solution to a phenol-phthalein end-point using alcoholic KOH) and dividing the resultant figure by 45, the weight of a carboxyl group (—COOH).

The liquid carboxyl-terminated polymers employed have a molecular weight ranging from about 1000 to about 20,000, and a bulk viscosity from about 500 to about 2,000,000 centipoises, preferably from about 5000 to 1,000,000 centipoises, measured at 27°C. using a Brookfield LVT Viscometer with Spindle No. 7 at 0.5 to 100 rpm.

The carboxyl-terminated polymers are reacted with a compound containing both an epoxide and a vinylidene group, at a range of from about 1 mole to about 2 moles of epoxide to every 1 mole of carboxyl. Use of over 2 moles of epoxide per mole of carboxyl is not necessary to achieve excellent results. More preferably, the compound is used at from about 1.1 mole to about 1.5 mole of epoxide per 1 mole of carboxyl present. The compounds containing both an epoxide and a vinylidene group have the structure

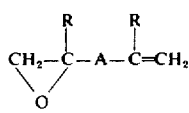

wherein R is hydrogen or a methyl radical and A is a bivalent radical containing 1 to about 6 atoms selected from C, O, S and N.

More preferredly, the compound is a vinylidene monomer containing a glycidyloxy structure as

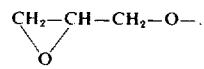

Examples of the more preferred compounds are isopropenyl glycidyl ether, allyl glycidyl ether, methallyl glycidyl ether, glycidyl acrylate, and glycidyl methacrylate. Even more preferred are glycidyl acrylate and glycidyl methacrylate.

The reaction can be conducted in bulk, preferably employing an excess of the epoxide-vinylidene compound, or the reaction can be conducted in a solvent. The choice of solvent is influenced by the solubility of the liquid carboxyl-terminated polymer used. Examples of useful solvents are heptane, hexane, acetone, methylethyl ketone, t-butyl alcohol, and the like. Acetone was found to be an excellent solvent for a variety of liquid polymers.

The reaction temperature is from about 50°C. to about 150°C. A more preferred temperature range is from about 60°C. to about 120°C. Total reaction time varies as to the reaction temperature and to the use of a catalyst. A normal reaction time is from about 2 hours to about 24 hours. The reaction is preferredly conducted in the absence of air or oxygen.

The reaction rate between the carboxyl group and the epoxide group can be accelerated by using a catalyst. Preferredly, the catalyst is a tertiary amine. Examples of these are dimethyl aniline 2,4,6-tri(dimethylaminomethyl)-phenol, and the like. The use of triphenyl phosphine as a catalyst also provides good results.

The catalyst is used in a range from about 0.05 to about 2 parts by weight based on 100 parts by weight of the liquid carboxyl-terminated polymer reactant. More preferredly, the catalyst is used at a level from about 0.1 part to 1 part by weight.

The vinylidene-terminated polymers can be isolated by direct drying under reduced pressure. If a base catalyst is employed, normally an acid, such as hydrochloric acid, can be added to neutralize the base prior to recovery. If the reaction is conducted in a solvent, the solution can be coagulated using water, lower alkyl alcohol, or an alcohol/water solution. Typically, the reaction is conducted as a bulk reaction employing only a small excess of the epoxide-vinylidene compound. As the reaction normally goes to completion, the liquid vinylidene-terminated polymer can be simply cooled down to room temperature and used as is.

The reaction between the liquid carboxyl-terminated dienic polymer and the epoxide-vinylidene compound can be conducted in the presence of a polymerizable vinyl monomer. The polymerizable vinyl monomers are the same as those which can be added to the vinylidene-terminated polymer to form the castable compositions of this invention. Thus, the practice of this invention allows for and includes, for example, the reaction of a liquid carboxyl-terminated polymer with a glycidyl monomer in the presence of styrene. The reaction solution (i.e., the liquid vinylidene-terminated polymer in styrene) can be stored for future use. Upon addition of a free-radical catalyst system, followed by heating until cure, the desired vulcanizates are obtained.

The Liquid Vinylidene-Terminated Polymers

The liquid vinylidene-terminated polydienic polymers have the structure

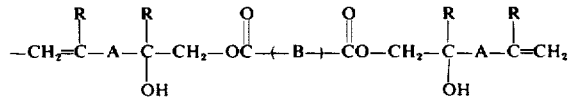

wherein B is a polymeric backbone of carbon-carbon linkages; A is a bivalent radical containing 1 to 6 atoms of C, O, S or N; and R is hydrogen or a methyl radical. The radical A originates from the compound containing both the epoxide and the vinylidene group. More preferredly, A is

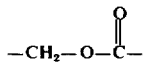

which is derived from the use of glycidyl acrylate or glycidyl methacrylate, $-CH_2-O-CH_2-$ which is derived from the use of allyl glycidyl ether or methallyl glycidyl ether, or $-CH_2-O-$ which is derived from the use of isopropenyl glycidyl ether. The polymeric backbone B originates from the polymeric backbone of the carboxyl-terminated polymer reactant.

The polymers are characterized by having highly reactive terminal vinylidene ($CH_2=C<$) groups. The polymers haave a theoretical reactive vinylidene functionality of 2.0; i.e., one reactive vinylidene group at each end of the polymer molecule. However, the vinylidene-terminated polymers can be prepared from liquid polymers which have an average functionality of less than two. Because of this, and also due to incomplete conversions, the novel polymers can have an average reactive vinylidene functionality as low as about 1.2. The liquid polymer reactants used to prepare the novel polymers can also have additional carboxyl functional groups as pendant groups. When such a polymer reactant is employed, the polymers can have more than 2, and up to about 4 reactive vinylidene groups. Therefore, the novel polymers can have an average reactive vinylidene functionality of from about 1.2 to about 4. More preferredly, the novel polymers have an average reactive vinylidene functionality of from about 1.5 to about 2.5.

Polymers where the polymeric backbone (B) consists of polymerized units of butadiene or isoprene monomer, alone or copolymerized with acrylonitrile and/or acrylic acid monomer are particularly preferred. Examples of such polymeric backbones are poly(butadiene), poly(isoprene), poly(butadiene-acrylonitrile), poly(isoprene-acrylonitrile), poly(butadiene-acrylonitrile-acrylic acid), and the like. In these instances, the dienic content of the backbone is from about 60% to 100% by weight, the acrylonitrile content being up to about 40% by weight, and the acrylic acid content being up to about 10% by weight, and often used in partial replacement of the acrylonitrile monomer.

The polymeric backbone B comprises about 40% to about 99% by weight of the total weight of the polymer, with the radical

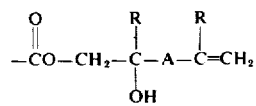

comprising from about 1% to about 60% by weight. More preferably, the radical comprises from about 3% to about 28% by weight of the liquid vinylidene-terminated polymer. When a liquid dienic polymer having a terminal carboxyl group content of about 2% by weight is employed, and glycidyl acrylate is used as the vinylidene monomer containing an epoxide group, the radical content is about 9% by weight and the backbone about 91% by weight, both based on the total weight of the polymer.

The liquid vinylidene-terminated polymers have a molecular weight of from about 1000 to about 20,000 as measured using a Mechrolab Vapor Pressure Osmometer. The polymers are more conveniently described by their bulk viscosity. The polymers have a bulk viscosity of from about 500 centipoises to about 2,000,000 centipoises (measured at 27°C. using a Brookfield Model LVT Viscometer with spindle No. 7 at 0.5 to 100 rpm). More preferably, the polymers have a bulk viscosity from about 5000 centipoises to about 1,000,000 centipoises. Polymers having a bulk viscosity from about 10,000 centipoises to about 400,000 centipoises are particularly useful in caulk, sealant, and potting compound applications.

As the liquid polymers have highly reactive terminal vinylidene groups, they can be admixed with an antioxidant to hinder premature air oxidation. The antioxidant is used in a range from about 0.1 to about 5 parts by weight per 100 parts by weight of polymer. The antioxidants are typical amine and hindered phenol type antioxidants such as phenyl-β-naphthylamine, di-β-naphthyl-p-phenylenediamine, 2,6-di-t-butyl paracresol, 1,3,5-tris(3,5-di-t-butyl-4-hydroxybenzyl)isocyanurate, and other useful antioxidants.

The Castable Compositions

The liquid vinylidene-terminated polydienic polymers are admixed with at least one polymerizable vinyl monomer and a free-radical catalyst system. Standard mixing techniques and internal mixers can be used. The castable compositions are quite fluid and easily mixed. High shear mixing need only be used for compositions containing large amounts of filler and the like.

The polymerizable vinyl monomer is selected from those vinyl monomers previously described as comprising the polymeric backbone of the carboxyl-terminated dienic polymer, i.e., the dienes, vinyl aromatics, vinyl nitriles, vinyl acids, vinyl and allyl alcohols, vinyl and allyl esters, vinyl and allyl ethers, divinyls and diacrylates, and acrylic esters defined previously. These monomers can be used alone or in combination with each other. The polymerizable vinyl monomer is used at from about 20 parts to about 180 parts by weight, and more preferredly at from about 50 parts to about 150 parts by weight per 100 parts by weight of the liquid vinylidene-terminated polymer.

More preferredly, the polymerizable vinyl monomer is selected from those vinyl monomers which when homopolymerized yield polymers having glass transition temperatures over 0°C. These monomers include vinyl aromatics such as styrene, α-methyl styrene, chlorostyrene, chloromethyl styrene, vinyl benzene, divinyl benzene, vinyl toluene, and the like; lower alkyl (1–4 carbon atom alkyl)methacrylates and ethacrylates such as methyl methacrylate, ethyl methacrylate, ethyl ethacrylate, and the like; acrylonitrile, methacrylonitrile, vinyl acetate, vinyl chloride, vinyl formal, p-vinyl benzyl alcohol, diethylene glycol diacrylate, and the like. The use of styrene as the polymerizable vinyl monomer has yielded excellent compositions.

The free-radical catalyst system comprises any of the well-known radical catalysts and, optionally, a catalyst promoter. Examples of free-radical catalsts are peroxides and hydroperoxides such as benzoyl peroxide, cumene peroxide and hydroperoxide, lauroyl peroxide, t-butyl peroxide and hydroperoxide, methylethyl ketone peroxide, and the like; persulfates such as sodium, potassium and ammonium persulfate; azobisisobutyronitrile, and t-butyl perbenzoate, and the like. Catalyst promoters include metal salts such as cobalt, tin, and lead salts like cobalt naphthenate; and amines such as dimethylaniline, triethylamine, triethanolamine, and the like; and compounds like triphenylphosphine. The total weight of the free-radical catalyst system, whether or not a catalyst promoter is used, is from about 0.1 part to about 5 parts, more preferably from about 0.5 part to about 3 parts by weight based upon 100 parts by weight of the liquid vinylidene-terminated polymer.

Many compounding ingredients can be admixed with the castable compositions. Such ingredients include fillers such as clays, silicas, oxides, carbon blacks, resins, asbestos, and the like; plasticizers and extenders such as diisobutyl oleate, diisooctyl sebacate, dibenzyl phthalate, ASTM oils, glycerin, and the like; and tackifiers, waxes, fungicides, and the like.

The castable compositions can be poured or injected into place. The compositions are heated to effect cure. Temperature and time of cure are somewhat dependent upon the type and amount of catalyst used, whether a catalyst promoter is used, and the type of polymerizable monomer employed. However, temperatures of from about 20°C. to about 200°C. and cure times of from about 30 minutes to about 20 hours are satisfactory. The cure should be conducted in a closed mold in the absence of air. The castable compositions are useful to prepare caulks and sealants for filling cracks and crevices, voids, and the like, as potting compounds and encapsulants, and in the preparation of molded products using stationary molds or rotational casting, and in preparing protective coatings.

The vulcanizates are elastomeric in nature, having tensile strengths in excess of 400 psi. Tensile and elongation properties were measured following ASTM D412 Hardness and measured following ASTM D2240 using a type A durometer. Air test tube aging followed ASTM D865 (70 hours at 100°C.).

The following examples serve to more fully illustrate the invention.

EXAMPLE I

Liquid vinylidene-terminated poly(butadiene-acrylonitrile) polymers (VTBN) were prepared by the reaction of a liquid carboxyl-terminated poly(butadiene-acrylonitrile) polymer (CTBN) with glycidyl acrylate or glycidyl methacrylate. The carboxyl-terminated polymers are commercially available, or can be prepared following the procedure given in U.S. Pat. No. 3,285,949. The CTBN polymers employed are identified in the following table:

|        | Wt. % Carboxyl | Viscosity cps at 27°C. |
|--------|----------------|------------------------|
| CTBN-1 | 2.61           | 126,000                |
| CTBN-2 | 2.29           | 131,000                |
| CTBN-3 | 2.34           | 118,000                |
| CTBN-4 | 2.52           | 126,000                |

Carboxyl content was measured directly. All of the CTBN polymers had acrylonitrile contents of about 18% by weight, as determined by analysis for the nitrogen content using the Kjehldahl method. Weight percent butadiene is determined as 100% minus the combined carboxyl and acrylonitrile contents.

The CTBN polymers were placed into a reactor vessel, the glycidyl acrylate or methacrylate added, and a vacuum applied to evacuate the vessel of air. Nitrogen gas was then added to a positive 5 to 10 psig pressure. The recipes used (in parts by weight), reaction conditions, and VTBN polymer obtained are as follows:

|                                      | 1       | 2       | 3       | 4       |
|--------------------------------------|---------|---------|---------|---------|
| CTBN-1                               | 100     | —       | —       | —       |
| CTBN-2                               | —       | 100     | 100     | 100     |
| CTBN-3                               | —       | —       | —       | —       |
| CTBN-4                               | —       | —       | —       | —       |
| Glycidyl acrylate                    | 8.8     | 8.9     | 8.9     | 8.9     |
| Glycidyl methacrylate                | —       | —       | —       | —       |
| Temperature, °C.                     | 125     | 125     | 65/95$^a$ | 95/115$^b$ |
| Time, hours                          | 8       | 2       | 32      | 17      |
| VTBN product                         |         |         |         |         |
| Viscosity, cps at 27°C.              | 272,000 | 264,000 | 182,000 | 171,000 |
| Residual carboxy content %           | 0.20    | 0.32    | 0.19    | 0.29    |
| % conversion of carboxyl to vinylidene | 92    | 86      | 92      | 87      |

|                                      | 5       | 6       | 7       | 8       | 9       |
|--------------------------------------|---------|---------|---------|---------|---------|
| CTBN-1                               | —       | —       | —       | —       | 100     |
| CTBN-2                               | —       | —       | —       | —       | —       |
| CTBN-3                               | 100     | —       | —       | —       | —       |
| CTBN-4                               | —       | 100     | 100     | 100     | —       |
| Glycidyl acrylate                    | 8.0     | 8.6     | 9.7     | 9.7     | —       |
| Glycidyl methacrylate                | —       | —       | —       | —       | 9.9     |
| Temperature, °C.                     | 95      | 65/115$^c$ | 95   | 95      | 125     |
| Time, hours                          | 20      | 26      | 16      | 11      | 8       |
| VTBN product                         |         |         |         |         |         |
| Viscosity, cps at 27°C.              | 328,000 | 298,000 | 246,000 | 212,000 | 572,000 |

|                              | -continued |      |      |      |      |
|------------------------------|-----------:|-----:|-----:|-----:|-----:|
|                              | 1          | 2    | 3    |      | 4    |
| Residual carboxyl content %  | 0.27       | 0.11 | 0.18 | 0.18 | 0.10 |
| % conversion of carboxyl to vinylidene | 88 | 96 | 93 | 93 | 96 |

$^a$Raised temperature to 85°C. after 16 hours and to 95°C. after 24 hours.
$^b$Raised temperature to 105°C. after 12 hours and to 115°C. after 14 hours.
$^c$Raised temperature to 95°C. after 12 hours and to 115°C. after 20 hours.

In all of the runs, high conversion of carboxyl to vinylidene groups occurred. The VTBN polymers were analyzed, and typical properties of these polymers are: about 200,000 centipoise viscosity, about 0.2% by weight residual carboxyl content, about 16% by weight acrylonitrile content, and about a 3500 molecular weight. The amount of glycidyl acrylate or methacrylate attached to the CTBN polymer constitutes about 7% by weight of the VTBN polymer. The glass transition temperature (Tg value) of the VTBN polymer is about −55°C.

EXAMPLE II

Following the procedure of Example I, liquid vinylidene-terminated polybutadiene polymers (VTB) were prepared by reacting liquid carboxyl-terminated polybutadiene polymers (CTB) with glycidyl acrylate. The recipes and results follow.

|                                | 1         | 2       | 3       |
|--------------------------------|----------:|--------:|--------:|
| CTB-1                          | 100       | —       | —       |
| CTB-2                          | —         | 100     | 100     |
| Glycidyl acrylate              | 6.6       | 6.8     | 6.8     |
| Temperature, °C.               | 125       | 95      | 95      |
| Time, hours                    | 8         | 12      | 12      |
| Viscosity, cps at 27°C.        |           |         |         |
| CTB                            | 39,500    | 54,000  | 54,000  |
| VTB                            | 1,360,000 | 220,000 | 198,000 |
| Percent Carboxyl Content       |           |         |         |
| CTB                            | 1.75      | 1.98    | 1.98    |
| VTB                            | 0.22      | 0.22    | 0.31    |
| Percent conversion of carboxyl to vinylidene | 88 | 89 | 84 |

High conversion of carboxyl to vinylidene groups occurred. The Tg value of Sample 3 was measured to be −80°C. The infrared spectra of the VTB polymers show the presence of ester linkages resulting from the carboxyl/epoxy reaction.

EXAMPLE III

The reaction between the liquid carboxyl-terminated polymer and the vinylidene containing epoxy compound produces a polymer having highly reactive, terminal vinylidene groups. These groups are much more responsive to known curing agents than are cis or trans configuration unsaturation sites or vinyl configuration unsaturation sites. The following cure study demonstrates this.

|                     |     |     |     |
|---------------------|----:|----:|----:|
| VTB$^a$             | 100 | —   | —   |
| CTB$^b$             | —   | 100 | —   |
| Hstyl B-2000$^c$    | —   | —   | 100 |
| Ethylenediamine     | 1.5 | 1.5 | 5.0 |
| Days at room temperature | 1 | 10 | 7 |
| Hardness, Duro.A    | 18  | no cure | no cure |
| % Elongation        |     |     |     |

$^a$Liquid vinylidene-terminated polybutadiene polymer having a viscosity of 27°C. of 188,000 cps and a residual carboxyl content of 0.14%
$^b$Liquid carboxyl-terminated polybutadiene polymer having a viscosity of 34,000 cps at 27°C. and a carboxyl content of 2.20%. The CTB was used to prepare the VTB polymer
$^c$Liquid polybutadiene polymer of about 2100 molecular weight

EXAMPLE IV

Castable compositions were prepared comprising liquid vinylidene-terminated poly(butadiene-acrylonitrile) polymers prepared in Example I, various polymerizable vinyl monomers, and various free-radical catalyst systems. The compositions are fluid at room temperature and are readily castable into molds or the like. They have good stability upon aging, but cure rapidly upon heating to yield elastomeric vulcanizates. The compositions prepared are (in parts by weight):

|                      | 1    | 2    | 3    | 4    | 5    | 6    | 7    | 8    | Control |
|----------------------|-----:|-----:|-----:|-----:|-----:|-----:|-----:|-----:|--------:|
| VTBN-1               | 100  | 100  | 100  | —    | —    | —    | —    | —    | —       |
| VTBN-9               | —    | —    | —    | 100  | 100  | —    | —    | —    | —       |
| VTBN-3               | —    | —    | —    | —    | —    | 100  | 100  | 100  | 100     |
| Styrene              | 98   | 98   | 145  | 98   | 98   | —    | —    | —    | —       |
| Methylmethacrylate   | —    | —    | —    | —    | —    | 40   | 60   | —    | —       |
| Acrylonitrile        | —    | —    | —    | —    | —    | —    | —    | 60   | —       |
| t-butyl perbenzoate  | 2    | —    | —    | 2    | —    | —    | —    | —    | —       |
| Benzoyl peroxide     | —    | 2    | 3    | —    | 2    | —    | —    | —    | —       |
| Cumene Hydroperoxide | —    | —    | —    | —    | —    | 1    | 1    | 1    | 1       |
| Cobalt naphthenate   | —    | —    | —    | —    | —    | 0.2  | 0.2  | 0.2  | 0.2     |
| Cured 1 hr. at 120°C. |     |      |      |      |      |      |      |      |         |
| Tensile, psi         | 780  | 600  | 1300 | 930  | 850  | 3500 | 1800 | 2600 | 150     |
| Elongation, percent  | 220  | 300  | 280  | 220  | 230  | 100  | 130  | 70   | 40      |
| Hardness, Duro. A    | 73   | 60   | 89   | 76   | 70   | —    | —    | —    | 54      |
| Duro. D              | —    | —    | —    | —    | —    | 75   | 70   | 53   | —       |
| Aged 70 hrs. at 100°C. |    |      |      |      |      |      |      |      |         |
| Tensile, psi         | 990  | 620  | 1240 | 1010 | 1010 | —    | —    | —    | —       |
| Elongation, %        | 220  | 230  | 250  | 180  | 180  | —    | —    | —    | —       |
| Hardness, Duro. A    | 83   | 68   | 93   | 85   | 82   | —    | —    | —    | —       |
| 180° Bend            | pass | pass | pass | pass | pass | —    | —    | —    | —       |

The data shows that the compositions of this invention, upon curing, yield vulcanizates having good tensile strength and extensibility. The vinylidene-terminated polymers, cured without a polymerizable vinyl monomer, yield vulcanizates of low strength and elongation (control sample). Styrene, methylmethacrylate, and acrylonitrile, if cured without the liquid vinylidene-terminated polymers, would yield hard plastics having an elongation of only a percent or two. Though neither of the two components cured along yield elastomeric products, the compositions of this invention unexpectedly do yield elastomeric vulcanizates having properties ideal for use as sealants and caulks, potting compounds, and the like.

EXAMPLE V

The vinylidene-terminated polybutadiene polymer prepared as sample 1 in Example II was admixed with styrene monomer and cured using a free-radical catalyst. The recipes and data follow:

|  | 1 | 2 |
|---|---|---|
| VTB-1 | 100 | 100 |
| Styrene | 98 | 98 |
| t-butyl perbenzoate | 2 | — |
| Benzoyl peroxide | — | 2 |
| Cured 1 hr. at 120°C. | | |
| Tensile, psi | 580 | 1050 |
| Elongation, percent | 250 | 280 |
| Hardness, Duro. A | 83 | 84 |

EXAMPLE VI

The VTB polymer prepared as Sample 2 in Example II was mixed with styrene and t-butyl perbenzoate, and the composition set into a heated temperature bath to measure its cure exotherm following the SPI Exotherm procedure given in Handbook of Reinforced Plastics, Reinhold Publishers (1964), Page 51. A high exotherm indicates a high degree of cure.

|  | 1 | 2 | 3 | 4 | 5 | 6 | 7 | 8 | 9 |
|---|---|---|---|---|---|---|---|---|---|
| VTB-2 | 100 | 100 | 100 | 75 | 75 | 75 | 50 | 50 | 50 |
| Styrene | — | — | — | 25 | 25 | 25 | 50 | 50 | 50 |
| t-butyl perbenzoate | 1 | 2 | 3 | 1 | 2 | 3 | 1 | 2 | 3 |
| Bath temperature, °F. | 248 | 248 | 248 | 248 | 248 | 248 | 212 | 212 | 212 |
| Peak temperature, °F. | 248 | 248 | 249 | 268 | 330 | 373 | 221 | 335 | 374 |
| ΔT, °F. | 0 | 0 | 1 | 20 | 82 | 125 | 9 | 123 | 162 |
| Time to peak temperature, minutes | — | — | 6 | 41 | 25 | 19 | 110 | 67 | 59 |

EXAMPLE VII

A castable composition was prepared using titanium dioxide as a filler. Desirable improved properties can be obtained by the use of standard rubber compounding ingredients in the compositions. In this instance, the use of a filler substantially improves the tensile strength of the vulcanizate. The TiO$_2$ was simple stirred into the composition. The recipes and data are:

|  | 1 | 2 |
|---|---|---|
| VTBN-3 | 50 | 50 |
| Styrene | 50 | 50 |
| Dimethylaniline | 0.2 | 0.2 |
| Benzoyl peroxide | 2.75 | 2.75 |
| Titanium dioxide | — | 20 |
| Cured 16 hrs. at room temp. plus 10 min. at 120°C. | | |
| Tensile, psi | 420 | 1050 |
| Elongation, percent | 310 | 300 |
| Hardness, Duro. A | 28 | 48 |
| Aged 70 hrs. at 100°C. | | |
| Tensile, psi | 450 | 970 |
| Elongation, percent | 260 | 230 |
| Hardness, Duro. A | 60 | 76 |

I claim:

1. Castable compositions comprising (1) a liquid vinylidene-terminated polymer being the reaction product of (a) a liquid carboxyl-terminated polymer of the structure

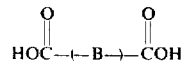

where B consists of interpolymerized units of about 20 percent to about 100 percent by weight of a diene monomer containing 4 to about 10 carbon atoms in the molecule, and up to 80 percent by weight of a vinyl monomer selected from the group consisting of vinyl aromatics, vinyl nitriles, vinyl acids, vinyl and allyl alcohols, vinyl and allyl esters, vinyl and allyl ethers, divinyls, diacrylates, and acrylic esters of the formula

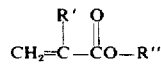

wherein R' is —H, —CH$_3$ or —C$_2$H$_5$, and R'' is an alkyl radical containing 1 to 18 carbon atoms or an alkoxyalkyl, alkylthioalkyl, or cyanoalkyl radical containing 2 to about 12 carbon atoms with (b) a compound containing a vinylidene group and an epoxide group selected from the group consisting of isopropenyl glycidyl ether, allyl glycidyl ether, methallyl glycidyl ether, glycidyl acrylate, and glycidyl methacrylate, (2) from about 20 parts to about 180 parts by weight of a polymerizable vinyl monomer and (3) from about 0.1 part to about 5 parts by weight of a free-radical catalyst system, the parts by weight of (2) and (3) based on 100 parts by weight of (1).

2. A composition of claim 1, wherein (2), the polymerizable vinyl monomer is selected from those monomers which, when homopolymerized, have a glass transition temperature above 0°C.

3. A composition of claim 2 wherein (2) is selected from the group consisting of vinyl aromatics and 1 to 4 carbon atom alkyl methacrylates.

4. A composition of claim 3 wherein the polymeric backbone consists of interpolymerized units of butadiene monomer.

5. A composition of claim 3 wherein the polymeric backbone consists of interpolymerized units of butadiene and acrylonitrile monomers.

6. A composition of claim 3 wherein the polymeric backbone consists of interpolymerized units of butadiene, acrylonitrile and acrylic acid monomers.

7. A composition of claim 3 wherein (2) is styrene.

* * * * *